Aug. 31, 1965  J. FALUDI  3,203,011
SAFETY COMPARTMENT FOR INFANTS FOR USE IN AUTOMOBILES
Filed March 23, 1964
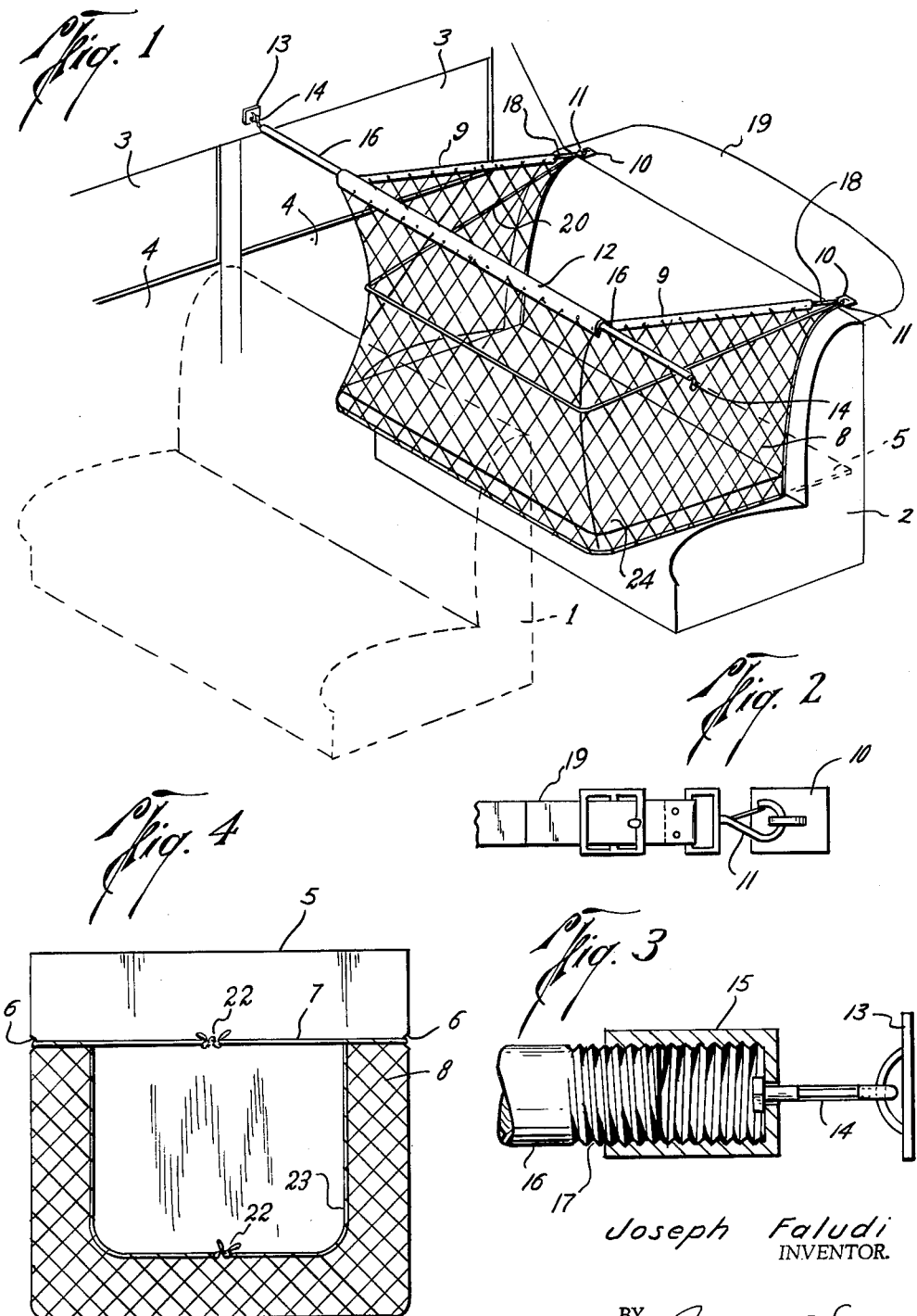
Joseph Faludi
INVENTOR.
BY Pamela O. Wyatt
ATTORNEY

United States Patent Office 3,203,011
Patented Aug. 31, 1965

3,203,011
SAFETY COMPARTMENT FOR INFANTS FOR USE IN AUTOMOBILES
Joseph Faludi, 1400 Holcomb Blvd., Houston, Tex.
Filed Mar. 23, 1964, Ser. No. 353,944
2 Claims. (Cl. 5—94)

This invention relates to new and useful improvements in a safety compartment for infants for use in automobiles.

It is an object of this invention to provide a device for use on the back seat of a passenger automobile to confine an infant during travel and that may be a playpen and bed readily assembled or removed from the automobile.

It is another object of the invention to provide a detachable playpen and bed that will safeguard the infant from being thrown violently against the hard back of the front seat, or the sides of the car, in the event of the necessity of a sudden brake application, or the like.

In present day use, for traveling by automobile with an infant, a playpen and bed is placed in the rear of the automobile, in some instances placing a floor on the rear seat. In such structures, it is customary to build the sides and front of such playpen of rigid material and then place cushioning material inside the pen area, thus greatly reducing the area, and subjecting the infant to the danger of violet contact with such rigid ends and sides in the event of sudden braking, or the like. It is an object of this invention to provide a light, readily detachable structure having yieldable sides and front, with means preventing the infant from contacting any rigid surface and providing a maximum area within the playpen.

It is another object of the invention to provide a safety compartment for infants for use in automobiles whereby a child may be safely confined, with freedom to move about within the compartment, and to see without obstruction, but will be unable to crawl out of the compartment into the front seat of the automobile.

With the above and other objects in view, the invention has relation to certain novel features of construction and arrangement of parts more particularly defined in the following specification and illustrated in the accompanying drawings, wherein:

FIGURE 1 is a perspective view of the device, shown mounted on the back seat of a passenger automobile.

FIGURE 2 is an enlarged fragmentary side elevational view of an anchoring means employed.

FIGURE 3 is an enlarged fragmentary side elevational view, in cross section, of another anchoring means employed, and FIGURE 4 is a bottom view of the device, showing the netting secured to the base member.

Referring now more particularly to the drawings, the numeral 1 designates a passenger automobile, having a front and rear seat, 1 and 2, and the usual doors and windows 3, 3 and 4, 4.

A base member 5 is employed, which may be a rectangular piece of plywood, or the like, having a suitable cover material, such as plastic, and having a pair of notches 6, 6 into which the cord 7 of the net 8 fits to anchor the net 8 on to the base member 5.

A cord 20 extends from the rear top margins of the net at an angle across the end portions of the net to a point substantially midway of the front margins of the net and then extends across the front of the net, reinforcing the enclosure. A similar cord 18 extends around the top of the net and is anchored to the fixtures 10, 10 having plates with semi-annular extensions to receive the cooperating fixtures on the cord 18, such as snap hooks 11, 11. If desired, suitable adjustable straps as 19 may be secured to the respective ends of the cords 18, 18, and on the other ends of which may be mounted the snap hooks 11, 11 so that the device may be adjustably mounted to fit any two seated passenger car, and the front of the device may be spaced the desired distance from the rear of the front seat so that there will be no contact with the front seat and the child using the device cannot gain access to the front seat by crawling over the rear of the front seat by reason of the top margin of the seat being adjacent the ceiling of the car. If desired, suitable padding material (not shown) may be suspended from the cord 20 extending across the front of the net.

The fixtures 10, 10 are anchored to the rear shelf 19' of the automobile with screws (not shown) of sufficient length to extend into the body framework of the vehicle.

A sleeve 12 extends across the front of the net 8, forming the top margin thereof, and sleeves 9, 9 extend across the ends of the net forming the top margins thereof. Rings 13, 13 are anchored to the body of the vehicle and tubular sleeves 15, 15 having snap hooks 14, 14 are mounted on one end thereof, which may be detachably secured to the rings 13 and the bar 16, preferably of rubber, or other yieldable material, having the externally threaded areas as 17, 17 adjacent each end which mesh in the internally threaded ends of the sleeves 15, 15 and the bar extends through the sleeve 12 and is adjustable to fit the various sizes of automobiles, such as by oppositely directed threads in the sleeves 15, 15 to cause the bar 16 to move in and out of the sleeves 15, 15 simultaneously as it is rotated.

When it is desired to utilize the rear seat of the automobile for a baby bed, the base member 5 is placed on the rear seat 2 and, where the seat and back of the vehicle are separate, is pushed between the seat and back to anchor the member in place, and the snap hooks 11, 11 secured to the fixtures 10, 10 and the snap hooks 14, 14 secured to the rings 13, 13, thus providing a rigid floor and an anchored yieldable net to retain an infant from being thrown against the back of the front seat or the sides of the car. The bar 16, being of yieldable material, will cushion any impact against said bar and the sleeve covering the cord will not be harmful to the infant as a result of chewing thereon. The sleeves 9, 12 being parts of the net, covers the bar 16 and cords 18, 18 but may be readily removed for washing. The oppositely threaded ends of the bar 16 and the internally threaded sleeves 15, 15 permit simultaneous movement of the bar in and out of the sleeve 15, providing means for adjustment of the bar 16 to the particular vehicle. The cord 7 will be provided with the marginal extension 23 around the bottom margin of the net 8 so that two adjustments may be possible, such as illustrated by the knots 22, 22, to maintain the net tightly around the base member 5.

The base member 5 may be covered with suitable plastic material, or may be provided with a suitable cushioned material 24 as an integral part thereof to form the floor of the pen.

While the foregoing is considered a preferred form of the invention, it is by way of illustration only, the broad principle of the invention being defined by the appended claims.

What I claim is:

1. In a safety compartment for infants to be used on rear seats of a passenger automobile, anchor means mounted on the rear shelf of the automobile and anchor means mounted on the inside walls of the automobile, a rectangular base member resting on the rear seat of the automobile, a netting anchored onto the said base member and extending upwardly from the end and front margins of said base member, reinforcing cords in said netting and snap hooks in said cord engageable with the means on the rear shelf of the vehicle and sleeves on the upper margins of said netting, a bar extending through the sleeve on the front upper margin of said netting, tubular members detachably secured to the ends of said bar, snap hooks on said tubular members engageable with the anchor means on the side walls of the vehicle body.

2. In a safety compartment for infants for use on the rear seats of a passenger automobile, a base member, a netting having a top and bottom margin, a reinforcing cord extending along the bottom margin of said netting, a reinforcing cord in the upper margin of said netting and a reinforcing cord extending at an angle across the end margins of said netting and across the front of said netting midway of the upper and lower margins thereof, means for detachably anchoring the respective ends of said cord in the upper margin of said netting to the body of the vehicle, a sleeve secured to the front upper margin of said netting, a bar adjustably mounted in said last mentioned sleeve and means for detachably securing said bar to the side walls of the automobile.

References Cited by the Examiner

UNITED STATES PATENTS

| 2,706,819 | 4/55 | McClure | 5—94 |
| 2,826,246 | 3/58 | Adams et al. | 297—390 |
| 2,988,135 | 6/61 | Caminiti | 5—94 X |

FOREIGN PATENTS 160,052  3/21  Great Britain.

FRANK B. SHERRY, *Primary Examiner.*